(12) United States Patent
Kim et al.

(10) Patent No.: US 7,396,572 B2
(45) Date of Patent: Jul. 8, 2008

(54) ALIGNMENT LAYER AND LIQUID CRYSTAL DISPLAY WITH THE SAME

(75) Inventors: Yeon-Cu Kim, Asan-si (KR);
Hyang-Shik Kong, Cheonan-si (KR);
Young-Kuil Joo, Cheonan-si (KR);
Young-Geol Song, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 11/520,888

(22) Filed: Sep. 14, 2006

(65) Prior Publication Data

US 2007/0059457 A1    Mar. 15, 2007

(30) Foreign Application Priority Data

Sep. 14, 2005    (KR) .................. 10-2005-0085632

(51) Int. Cl.
*C09K 19/56* (2006.01)
(52) U.S. Cl. ................. 428/1.26; 528/353; 349/135

(58) Field of Classification Search ................. 428/1.1, 428/1.26; 528/353, 170, 172–173; 349/135, 349/143; 345/92
See application file for complete search history.

(56) References Cited

U.S. PATENT DOCUMENTS

| 5,773,559 | A | * | 6/1998 | Miyamoto et al. | ........... 528/353 |
| 6,417,828 | B1 | * | 7/2002 | Sato et al. | ........... 345/89 |
| 2001/0010575 | A1 | * | 8/2001 | Yoshida et al. | ........... 349/141 |

* cited by examiner

*Primary Examiner*—Terrel Morris
*Assistant Examiner*—Sophie Hon
(74) *Attorney, Agent, or Firm*—Cantor Colburn LLP

(57) ABSTRACT

A liquid crystal display includes; a first and a second display panel facing each other, an alignment layer formed on at least one of the first and the second display panels and including a polyamic acid moieties and a polyimide moieties which form a block copolymer, and a liquid crystal layer interposed between the first display panel and the second display panel.

6 Claims, 6 Drawing Sheets

ALIGNMENT LAYER AND LIQUID CRYSTAL DISPLAY WITH THE SAME

This application claims priority to and the benefit of Korean Patent Application No. 10-2005-0085632, filed on Sep. 14, 2005, and all the benefits accruing therefrom under 35 U.S.C. § 119, the contents of which in its entirety are herein incorporated by reference.

BACKGROUND OF THE INVENTION (a) Field of the Invention

The present invention relates to an alignment layer and a liquid crystal display including the same.

(b) Description of the Related Art

The liquid crystal display ("LCD") is one of the most widely used flat panel displays. An LCD comprises two panels provided with field-generating electrodes such as pixel electrodes and a common electrode and a liquid crystal ("LC") layer interposed therebetween. The LCD displays images by applying voltages to the field-generating electrodes to generate an electric field in the LC layer, which determines the orientation of LC molecules in the LC layer to adjust polarization of incident light.

In most liquid crystal displays the two field generating electrodes are respectively provided on each panel of the display. In such an arrangement, usually one of the two panels has a plurality of pixel electrodes arranged in matrix formation and the other panel has a common electrode covering almost the entire surface of the panel.

The LCD displays images by applying voltages to each pixel electrode. For this reason, thin film transistors ("TFTs"), which are triple terminal elements and are connected to the pixel electrodes to switch applied voltages to the pixel electrodes, are provided on the panel. Gate lines transmitting signals to control the TFTs and data lines delivering voltages to be applied to the pixel electrodes are also formed on one of the panels.

The TFTs allow or block transmission of data signals which are propagating along the data lines to the pixel electrode.

Additionally, each panel of the display has an alignment layer to orient the liquid crystal molecules of the LC layer.

The alignment layer is typically made of a polyimide material because of its excellent chemical resistance and LC alignment characteristics.

Polyimide has a low solubility. Therefore, polyamic acid, the precursor of polyimide in a liquid state, is coated to form an alignment layer and is processed to transform the coated polyamic acid into polyimide. However some of the coated polyamic acid remains after the processing step. Consequently, polyimide and polyamic acid coexist in the alignment layer.

However, polyimide is immiscible with polyamic acid, so they will not mix to form a heterogeneous structure within the alignment layer. Since the only force existing between polyimide and polyamic acid is the Van der Waals force, which is a weak attractive force between certain molecules, some portions of the polyimide alignment layer may come off by a mechanical force such as rubbing.

The fragments which come off from the alignment layer may attach to a rubbing cloth used to apply the alignment layer. This may cause further damage to the rest of the alignment layer. Additionally, the fragments of the alignment layer may drift free and become impurities in the LC layer. These impurities dishevel alignment of the liquid crystal molecules and cause a stained image on the resulting LCD.

BRIEF SUMMARY OF THE INVENTION

The present invention has been made in an effort to provide an alignment layer and a liquid crystal display using the same, having advantages of solving the above mentioned problems by preventing fragments and defects from the alignment layer.

An alignment layer comprises; a polyamic acid moieties and a polyimide moieties having dianhydride structure, wherein the polyamic acid moieties and the polyimide moieties form a block copolymer.

The block copolymer may be described by the following structural formula,

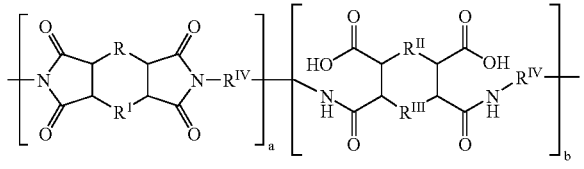

wherein R, $R^I$, $R^{II}$, $R^{III}$ and $R^{IV}$ are linkage groups chosen among aliphatic groups or aromatic groups and 'a' and 'b' are integers respectively chosen from the numerals of about 10 to about 500.

The alignment layer has a first region wherein most of the polyamide moieties are disposed and a second region wherein most of the polyamic acid moieties are disposed.

The first region and the second region are connected to each other with a covalent bond formed between the polyimide moieties and the polyamic acid moieties.

The liquid crystal display comprises; a first display panel and a second display panel facing each other, an alignment layer formed on at least one of the first and the second display panels and including a polyamic acid moieties and a polyimide moieties which form a block copolymer, and, a liquid crystal layer interposed between the first display and the second display panel.

The polyamic acid moieties and the polyimide moieties have dianhydride structure.

The block copolymer may be described by following structural formula;

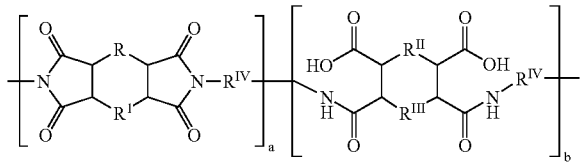

wherein R, $R^I$, $R^{II}$, $R^{III}$ and $R^{IV}$ may be linkage groups chosen among an aliphatic group or an aromatic group and 'a' and 'b' may be integers respectively chosen from the numerals of about 10 to about 500. The polyamic acid moieties and the polyimide moieties may be covalently bonded.

The polyamic acid moieties and the polyimide moieties may be connected through linkage group including an aromatic group.

The alignment layer has a first region wherein most of the polyimide moieties are disposed and a second region wherein most of the polyamic acid moieties are disposed.

The first region and the second region may be connected to each other with a covalent bond formed between the polyimide moieties and the polyamic acid moieties.

The liquid crystal display may further comprise; a plurality of gate lines formed on the first display panel including, a plurality of data lines intersecting the gate lines, a plurality of thin film transistors connected to the gate lines and the data lines, and a plurality of pixel electrodes connected to the thin film transistors.

The alignment layer may align liquid crystal molecules of the liquid crystal layer substantially parallel to surfaces of the first display panel and the second display panel.

A method of manufacturing an alignment layer comprises; forming a block copolymer using a polyamic acid moieties and a polyimide moieties having a dianhydride structure, wherein the block copolymer is formed to be described by the following structural formula,

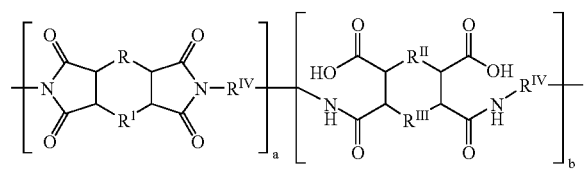

wherein R, $R^I$, $R^{II}$, $R^{III}$, and $R^{IV}$ are linkage groups chosen among aliphatic groups or aromatic groups and 'a' and 'b' are integers respectively chosen from the numerals of about 10 to about 500.

DETAILED DESCRIPTION OF THE INVENTION

Figure 1:
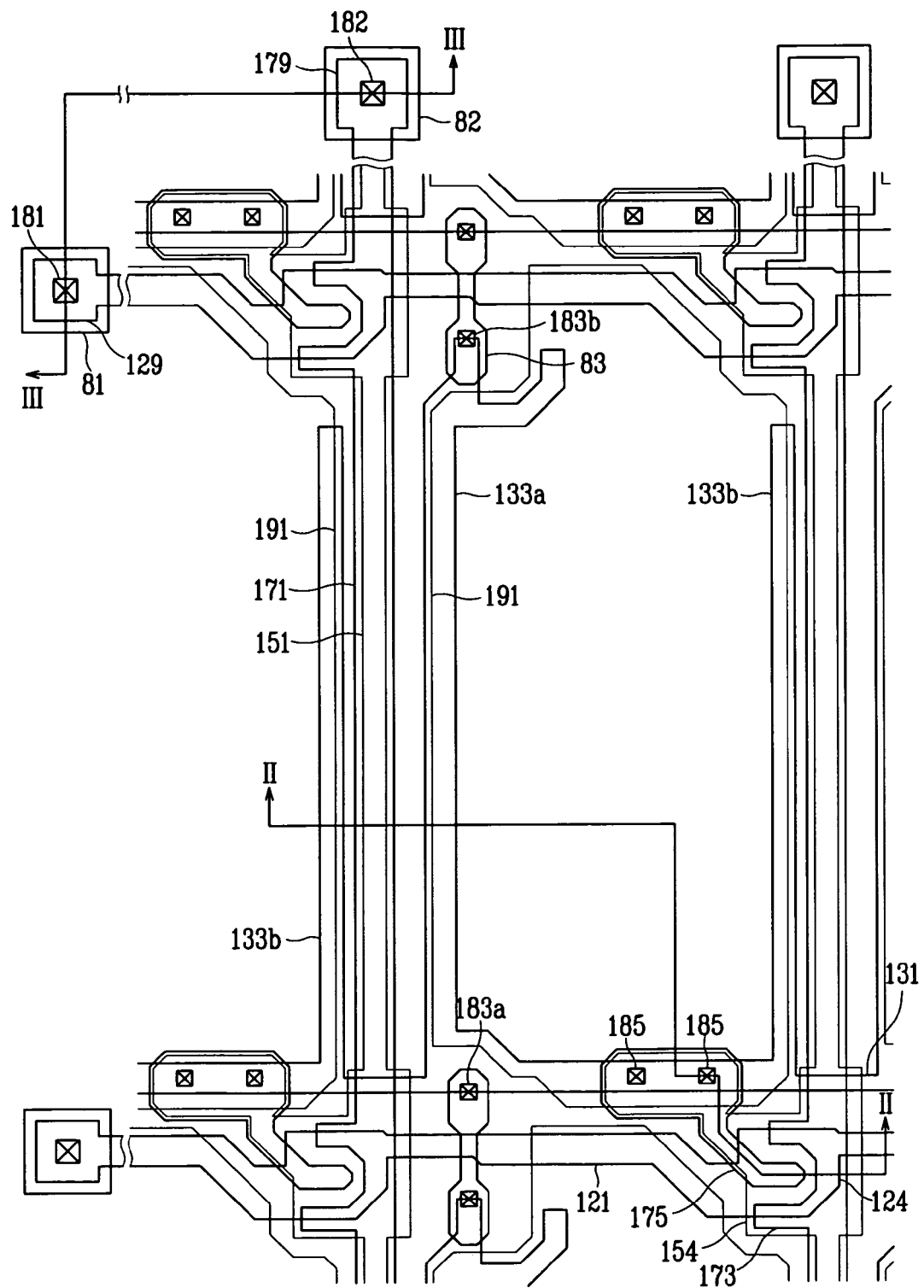
FIG. 1 is a top plan view layout of an exemplary embodiment of an LCD according to the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, the present invention will be described in detail with reference to the accompanying drawings.

Figure 2:
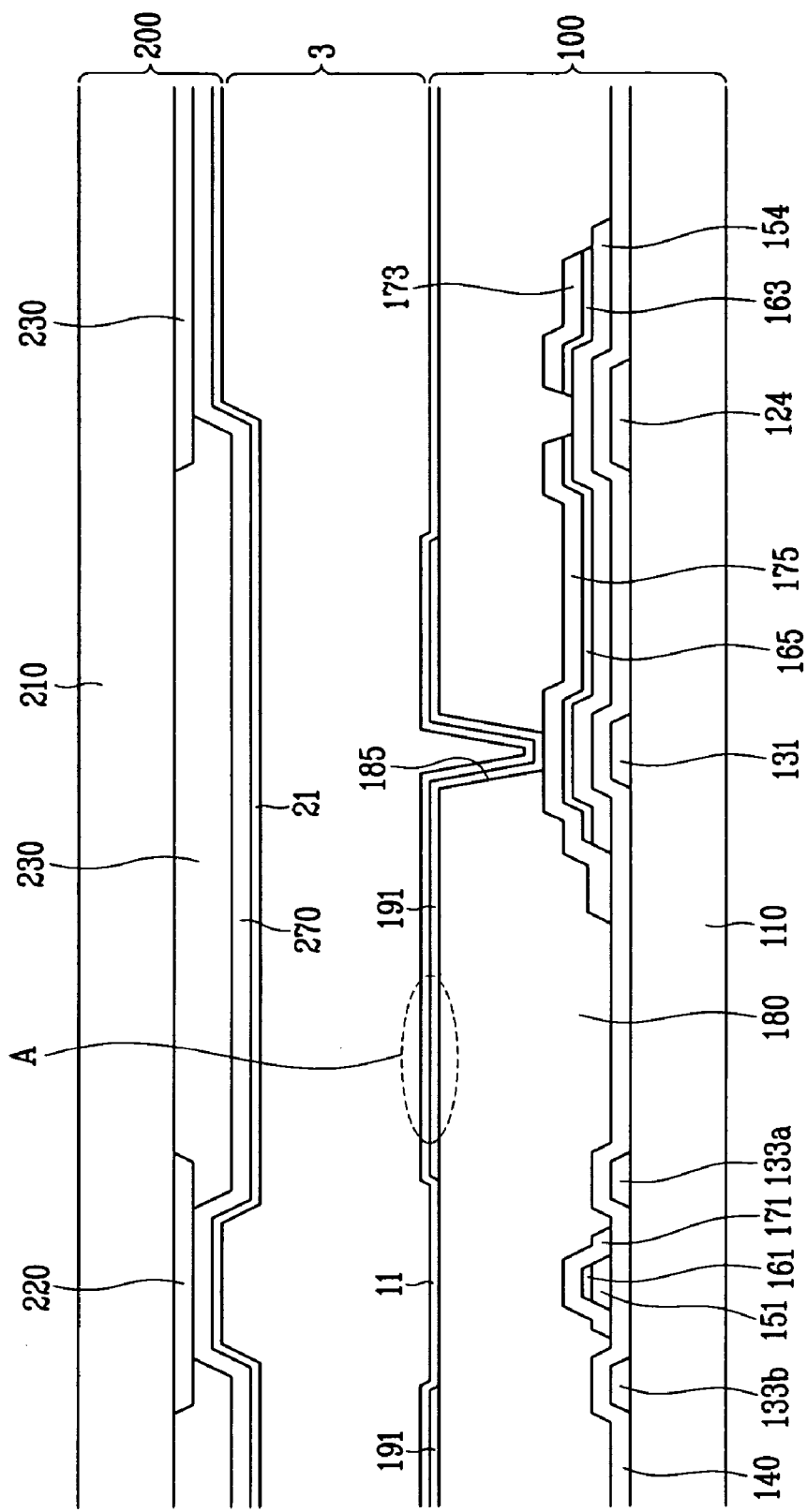
FIG. 2 and FIG. 3 are cross-sectional views of the exemplary embodiment of an LCD shown in FIG. 1 taken along lines II-II and III-III respectively.
Figure 3:
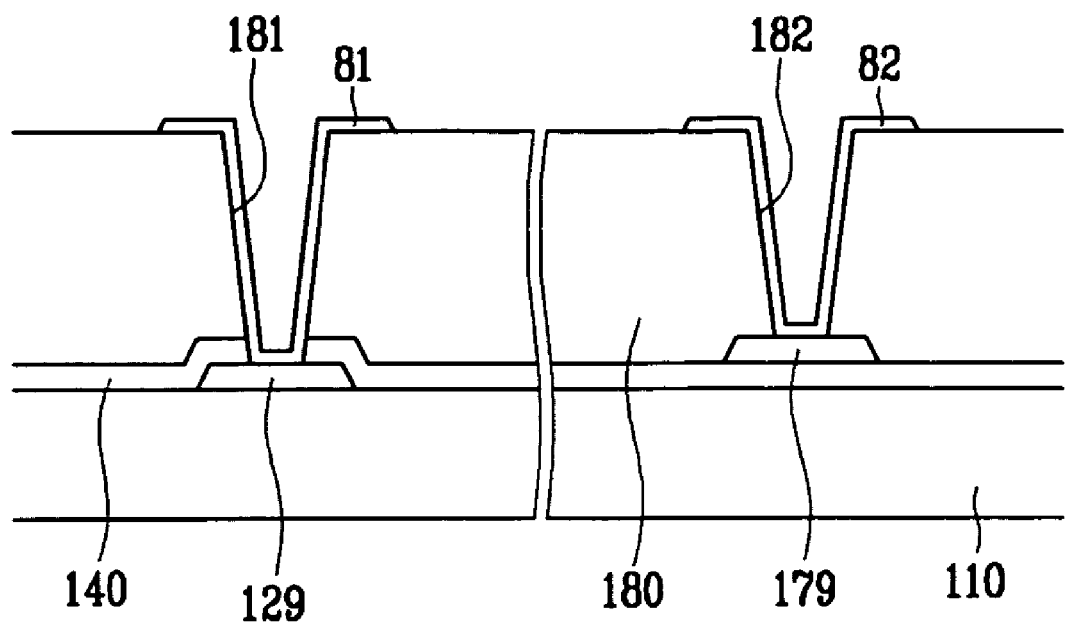

Now, an LCD according to an exemplary embodiment of the present invention will be more fully described referring to FIGS. 1-3

FIG. 1 is a top plan view layout of an exemplary embodiment of an LCD according to the present invention. FIG. 2 and FIG. 3 are cross-sectional views of the LCD shown in FIG. 1 taken along line II-II and III-III respectively.

Referring to FIGS. 1-3, the exemplary embodiment of an LCD according to the present invention includes a thin film transistor ("TFT") array panel 100, a common electrode panel 200 facing the TFT array panel 100, and a liquid crystal layer 3 interposed between the display panels 100 and 200.

First, the TFT array panel 100 will be described.

A plurality of gate lines 121 and storage electrode lines 131 are formed on an insulating substrate 110. Exemplary embodiments of the insulating substrate are made of a transparent glass or plastic, or other similar materials. The gate lines 121 transmit gate signals and extend in a substantially horizontal direction. Each of the gate lines 121 includes a plurality of gate electrodes 124 which project downward and include a wide end portion 129 to contact with other layers or an external driving circuit.

In the present exemplary embodiment a gate driving circuit (not shown), which generates gate signals, may be mounted on a flexible printed circuit film (not shown) which may be attached onto or directly mounted on the substrate 110. Alternative exemplary embodiments include configurations where the gate driving circuit may be directly integrated on the substrate 110. When the gate driving circuit is integrated on substrate 110, the gate lines 121 may be extended to be directly connected to the circuit.

Each of the storage electrode lines 131 is applied with predetermined voltages and includes a stem portion substantially parallel to each of the gate lines 121 and a plurality of pairs of first and second storage electrodes 133a and 133b which diverge from the stem portion. Each of the storage electrode lines 131 is disposed between two adjacent gate lines 121 and the stem is close to a gate line 121. The storage electrodes 133a and 133b have a fixed end portion connected to the stem and a free end portion which is opposite to the fixed end.

An exemplary embodiment of the first storage electrode includes a wide fixed end portion and a free end portion which is bifurcated into a linear branch and a curved branch. Alternative exemplary embodiments include configurations where the storage electrode lines 131 may have various shapes and arrangements.

Exemplary embodiments of the gate lines 121 and the storage electrode lines 131 may be made of an aluminum-based metal such as aluminum (Al) or an aluminum alloy, a silver-based metal such as silver (Ag) or a silver alloy, a copper-based metal such as copper (Cu) or a copper alloy, a molybdenum-based metal such as molybdenum (Mo) or a molybdenum alloy, chromium (Cr), tantalum (Ta), titanium (Ti), or other similar substances.

Alternative exemplary embodiments include configurations where the gate lines 121 and storage electrode lines 131 have a multi-layered structure including two conductive layers (not shown) having different physical properties. In such an alternative exemplary embodiment, one conductive layer may be made of a metal having low resistivity, such as an aluminum-based metal, a silver-based metal, and a copper-based metal so as to reduce the signal delay or the voltage drop. The other conductive layer is made of a material which has good physical, chemical, and electrical contacting characteristics with indium tin oxide ("ITO") and indium zinc oxide ("IZO"). Exemplary embodiments of such a conductive layer include a molybdenum-based metal, chromium, tantalum, and titanium. Exemplary embodiments of combinations of the two layers include a chromium lower layer and an aluminum (or aluminum alloy) upper layer, and a combination of an aluminum (or aluminum alloy) lower layer and a molybdenum (or molybdenum alloy) upper layer. The gate lines 121 and the storage electrode lines 131 may also be made of various metals or conductors other than these materials described above.

The lateral surfaces of the gate lines 121 and the storage electrode lines 131 are inclined relative to the surface of the substrate 110 and the inclination angle thereof may range from about 30 degrees to about 80 degrees.

A gate insulating layer 140, exemplary embodiments of which include silicon nitride ("SiNx") or silicon oxide ("SiOx"), is formed on the gate lines 121 and the storage electrode lines 131.

A plurality of semiconductor stripes 151 made of hydrogenated amorphous silicon (abbreviated to a-Si) or polysilicon is formed on the gate insulating layer 140. The semiconductor stripes 151 substantially extend in a longitudinal direction and include a plurality of projections 154 which protrude toward the gate electrodes 124.

A plurality of ohmic contact stripes and islands 161 and 165 respectively are formed on the semiconductor 151.

Exemplary embodiments of the ohmic contact stripes and islands 161 and 165 may be made of n+ hydrogenated amorphous silicon heavily doped with n-type impurity or made of silicide.

Each of the ohmic contact stripes 161 has a plurality of projections 163. The projections 163 and the ohmic contact islands 165 are located in pairs and are disposed on the projections 154 of the semiconductor stripes 151.

The lateral surfaces of the semiconductors 151 and the ohmic contacts 161 and 165 are also inclined relative to the surface of the substrate 110 and the inclination angles may range from about 30 degrees to about 80 degrees.

A plurality of data lines 171 and drain electrodes 175 are formed on the ohmic contacts 161 and 165 and the gate insulating layer 140.

The data lines 171, which transmit data signals, extend in a substantially vertical direction to intersect the gate lines 121. Each of the data lines 171 also intersects the storage electrode lines 131 and runs between two adjacent storage electrodes 133a and 133b. Each of the data lines 171 includes a plurality of source electrodes 173 extending toward the gate electrodes 124 and a wide end portion 179 for connecting to other layers or an external driving circuit. In the present exemplary embodiment a data driving circuit (not shown) which generates a data voltage may be mounted on a flexible printed circuit film (not shown) which is attached onto the substrate 110. Alternative exemplary embodiments include the configuration where the data driving circuit may be directly mounted on the substrate 110, or directly integrated on the substrate 110; in such an exemplary embodiment the data lines 171 may extend to be connected to the data driving circuit.

The drain electrodes 175 are separated from the data lines 171 and face the source electrodes 173 with the gate electrodes 124 interposed therebetween and underneath.

One gate electrode 124, one source electrode 173, and one drain electrode 175 form a single thin film transistor along with one projection 154 of the semiconductor stripes 151. A channel of the thin film transistor is formed on the projection 154 between the source electrode 173 and the drain electrode 175

The data lines 171 and the drain electrodes 175 may be made of refractory metals or their alloys; exemplary embodiments of which include Mo, Cr, Ta and titanium. Alternative exemplary embodiments include configurations where they may have a multilayered structure including a refractory metal layer (not shown) and low resistant conductive layer (not shown). Exemplary embodiments of the multilayer structure include a double layer having a chromium or molybdenum (or molybdenum alloy) lower layer and an aluminum (or aluminum alloy) upper layer, or a triple layer having a molybdenum (or molybdenum alloy) lower layer, an aluminum (or aluminum alloy) middle layer, and a molybdenum (or molybdenum alloy) upper layer. However, the data lines 171 and the drain electrodes 175 may be made of various metals or conductors other than those described above.

The lateral surfaces of the data lines 171 and the drain electrode 175 are inclined relative to the surface of the substrate 110. The inclination angle may range from about 30 degrees to about 80 degrees.

A passivation layer 180 is formed on the data lines 171, the drain electrodes 175, exposed portions of the ohmic contact stripe 161 and ohmic contact island 165, and an exposed portion of the semiconductor 151. The passivation layer 180 is made of an inorganic or organic insulator and may have a flat surface. Exemplary embodiments of an inorganic insulator are silicon nitride ("SiNx") and silicon oxide ("SiOx"). Exemplary embodiments of the organic insulator may have photosensitivity and a dielectric constant thereof of less than about 4.0. Alternative exemplary embodiments include configurations where the passivation layer 180 may have a double-layered structure including an inorganic lower layer and an organic upper layer so as to have the excellent insulating characteristics of a dielectric layer but also to not damage the exposed portion of the projection 154 of the semiconductor stripes 151.

A plurality of contact holes 182 and 185, which respectively expose the end portions 179 of the data lines 171 and the drain electrodes 175, are formed in the passivation layer 180. The passivation layer 180 and the gate insulating layer 140 include a plurality of contact holes 181 exposing the end portions 129 of the gate lines 121, a plurality of contact holes 183a exposing some portions of the storage electrodes line 131 located around the fixed end portions of the first storage electrodes, and a plurality of contact holes 183b exposing the projections of the free ends of the first storage electrode 133a.

A plurality of pixel electrodes 191, overpasses 83, and contact assistants 81 and 82 are formed on the passivation layer 180. Exemplary embodiments of which may be made of transparent conductive materials such as ITO or IZO, or reflective metals such as Al, Ag, Cr or their alloys.

The pixel electrodes 191 are physically and electrically connected to the drain electrodes 175 through the contact holes 185 and are thereby supplied with the data voltage from the drain electrodes 175. The pixel electrodes 191 applied with the data voltage generate electric fields in cooperation with a common electrode 270 of the other display panel 200 (to be described in further detail below) which is applied with a common voltage. The electric fields determine the direction of the LC molecule of the LC layer 3 disposed between the electrodes 191 and 270. Therefore, the polarization of light passing through the LC layer 3 is altered depending on the direction of the LC molecules as determined above. The pixel electrodes 191 and the common electrode 270 form a capacitor (hereinafter referred to as a "liquid crystal capacitor") which sustains the applied voltage even after the thin film transistor is turned off.

Each pixel electrode 191 overlaps the storage electrode line 131 as well as the storage electrodes 133a and 133b. Each pixel electrode 191 and each drain electrode 175 electrically connected to the pixel electrode 191 overlap each storage electrode line 131 to form an additional capacitor (hereinafter referred to as a "storage capacitor") which enhances the voltage sustaining ability of the liquid crystal capacitor.

The contact assistants 81 and 82 are respectively connected to the end portions 129 of the gate lines 121 and the end portions 179 of the gate lines 171 through the contact holes 181 and 182. The contact assistants 81 and 82 complement adhesion between the end portions 129 and 179 of the gate lines 121 and the data lines 171 and an external device, and protect the end portions 129 and 179.

Each overpass 83 intersects the gate line 121 to connect the exposed portion of the storage electrode line 131 and the exposed linear branch of the free end of the storage electrode 133a through the contact holes 183a and 183b which are disposed on opposite sides of the gate lines 121. The storage electrode lines 131 as well as the storage electrodes 133a and 133b and the overpasses 83 may be used for compensating for manufacturing defects of the gate lines 121 or the data lines 171.

The description of the common electrode panel 200 follows.

A light blocking member 220, also called the black matrix, is formed on an insulating substrate 210. Exemplary embodiments of the insulating substrate 210 are made of a transparent glass or plastic or other similar material. The light blocking member 220 includes a plurality of openings facing the pixel electrodes 191 and having almost the same shape as the pixel electrodes 191. The light blocking member 220 blocks light leakage between the pixel electrodes 191. The light blocking member 220 may have portions facing the gate lines 121, the data lines 171, and the TFTs.

The substrate 210 also includes a plurality of color filters 230. Each color filter 230 is disposed within a region enclosed by the light blocking member 220 and each color filter 230 may extend in a direction substantially parallel to the data lines 171. Each color filter 230 may display one of red, green and blue colors.

The common electrode 270, exemplary embodiments of which are made of a transparent conductor such as ITO or IZO, is formed on the color filters 230.

Alignment layers 11 and 21 are coated on the surfaces of the display panels 100 and 200 facing the liquid crystal layer. The alignment layers 11 and 21 may align the liquid crystal molecules parallel to surfaces of the panels 100 and 200.

A pair of polarizers (not shown) may be provided on the surfaces of the panels 100 and 200 opposite the liquid crystal layer, and their polarization axes may be crossed at right angles or parallel. In the exemplary embodiment where the LCD is a reflective LCD, as opposed to a backlight or transflective LDC, one of the polarizers may be omitted.

The liquid crystal layer 3 has a positive dielectric anisotropy. The liquid crystal molecules of the liquid crystal layer 3 are aligned to be substantially parallel to the surfaces of the display panels 100 and 200 in the absence of an electric field.

Exemplary embodiments of the alignment layers 11 and 21 according to the present invention will be described in detail with reference to FIG. 4A, FIG. 4B, FIG. 1, and FIG. 3.

Figure 4A:
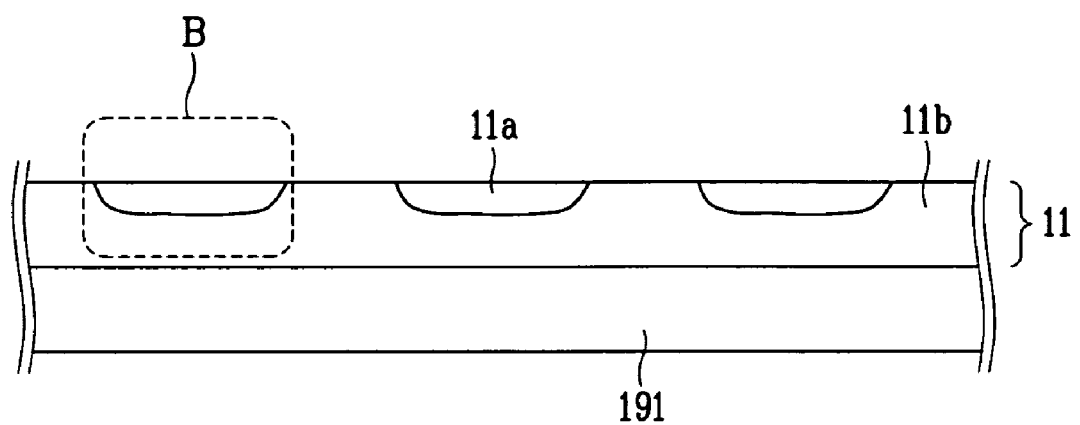
FIG. 4A is an enlarged view of the area "A" of the cross-sectional view of the exemplary embodiment of an LCD shown in FIG. 2.
Figure 4B:
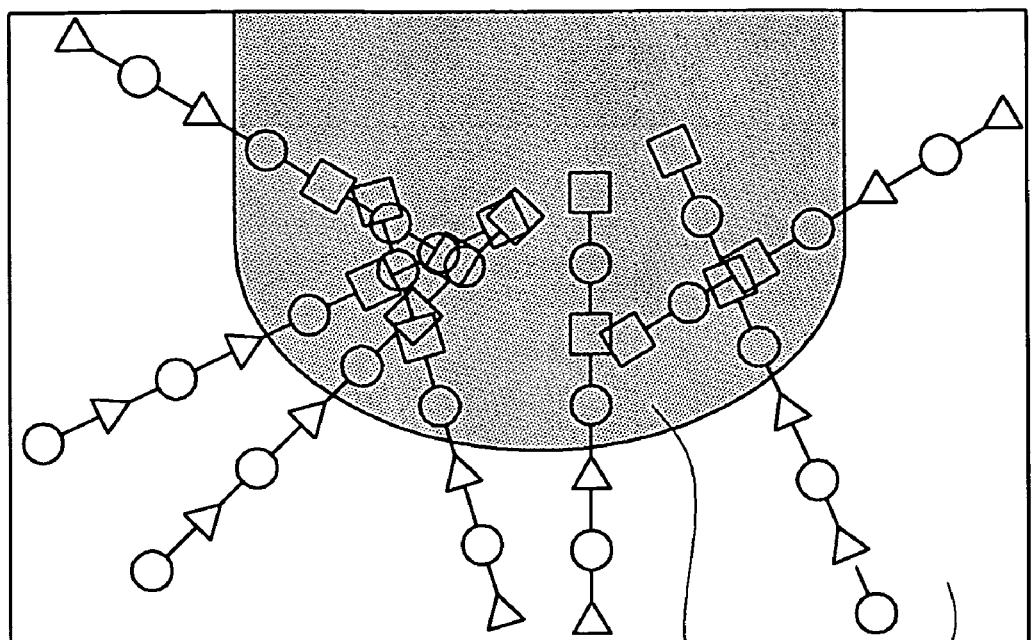
FIG. 4B is an enlarged schematic diagram of the area "B" of the enlarged cross-sectional view of the exemplary embodiment of an LCD shown in FIG. 4A.
Figure 4B:
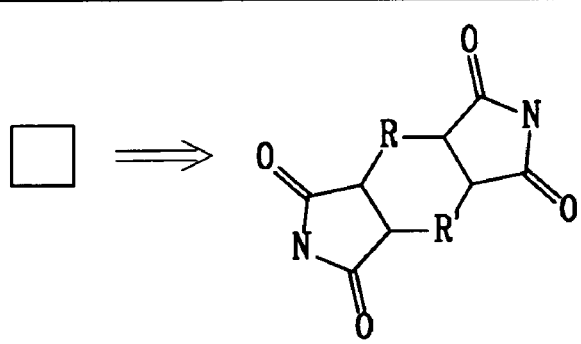
Figure 4B:
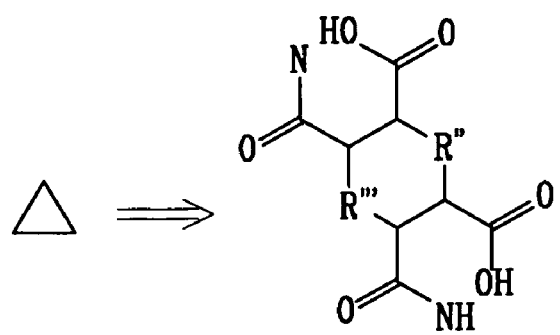
Figure 4B:
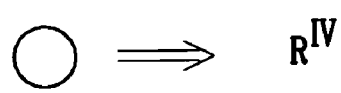

FIG. 4A is an enlarged view of the area "A" of the cross-sectional view of the exemplary embodiment of an LCD shown in FIG. 2. FIG. 4B is an enlarged schematic diagram of the area "B" of the enlarged cross-sectional view of the exemplary embodiment of an LCD shown in FIG. 4A.

In FIG. 4A and FIG. 2, the exemplary embodiment of an alignment layer 11 includes a plurality of first regions 11a which contact the LC layer 3 and a second region 11b in which the plurality of first regions 11a are embedded. The first regions 11a and the second region 11b are distinguished by the structures of the compounds which build the alignment layer 11. The first regions 11a comprise polyimide moieties including a plurality of imide groups and the second region lib comprise polyamic acid moieties including a plurality of amic acid groups.

The following chemical equation shows the structure of an exemplary embodiment of a compound which builds the alignment layer:

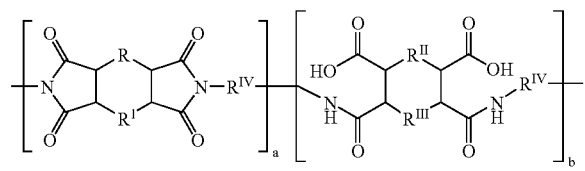

Each of these R, $R^I$, $R^{II}$, $R^{III}$ and $R^{IV}$ may be chosen from the aliphatic group or the aromatic group. The letters 'a' and 'b' may represent integers chosen respectively from about 10 to about 500. The compound is a block copolymer. Block copolymers are polymers which include at least two kinds of monomers which are arranged in respective regions. An exemplary embodiment of the block copolymer in the present invention includes a polyimide formed by polymerization of imide monomers (a) and a polyamic acid formed by polymerization of amic acid monomers (b).

Here, the polyimide and the polyamic acid form a covalent bond. Linkage groups RIV including the aliphatic compound or the aromatic compound may connect imide monomers to build a polyimide and may connect amic acid monomers to build a polyamic acid.

The block copolymer includes two or more polymers with different characteristics in a single polymer chain. If these two or more polymers are not combined, as in the comparative examples described in the background, the same kind of polymers conglomerate together. Accordingly, as shown in FIG. 4A., the first regions 11a having a polyimide and the second region 11b having a polyamic acid are distinguished in that they are formed interlinking with one another.

In reference to FIG. 4A and FIG. 4B, the first regions 11a mostly have the imide monomers (□) and the second region lib mostly has the amic acid monomers (Δ). Even though only a few of these monomers are illustrated in FIG. 4b the number of monomers included in a region may be much more than are shown in FIG. 4b.

The imide monomer (□) and the amic acid monomer (Δ) may be connected to each other through the linkage group (○) such as the aliphatic compound or the aromatic compound. The linkage group (○) covalently bonds with the imide monomer (□) and the amic acid monomer (Δ) to build a block copolymer. In the present exemplary embodiment, the first regions 11a including the imide groups are located to contact the LC layer 3 thereby aligning the liquid crystal molecules. The second region 11b including the amic acid groups forms a base of the alignment layer 11 to improve coating efficiency and adhesiveness of the alignment layer 11 and to absorb impurities of the LC layer.

Figure 5A:
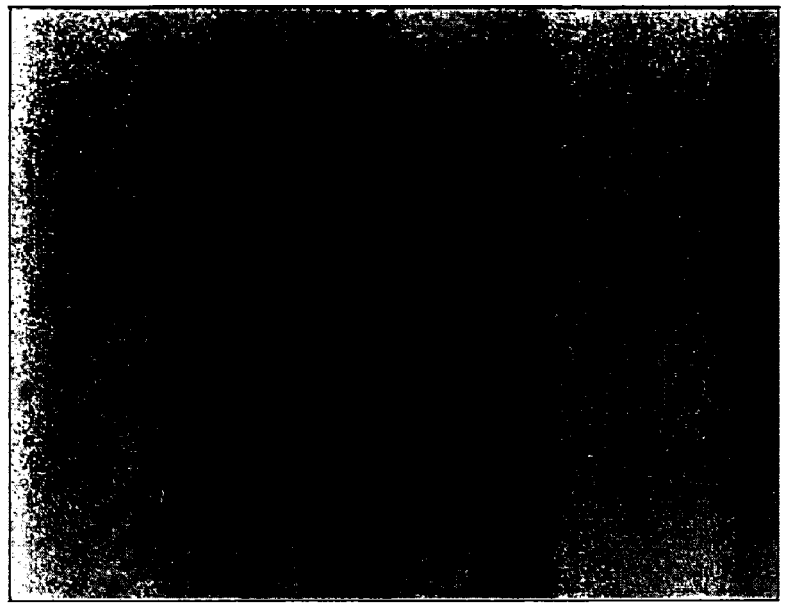
FIG. 5A is a picture of a surface of an exemplary embodiment of an alignment layer, taken after rubbing the alignment layer which is formed to have an exemplary embodiment of a block copolymer structure between polyimide and polyamic acid according to the present invention.
Figure 5B:
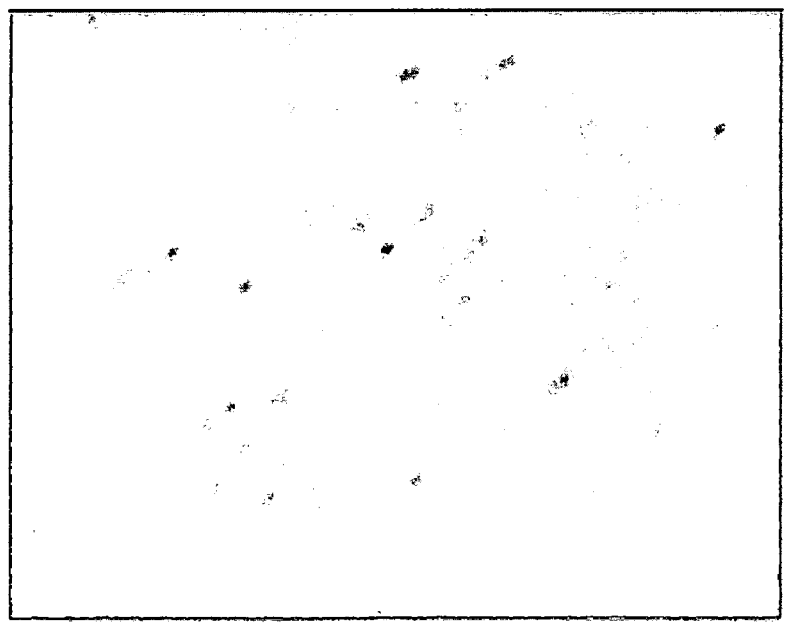
FIG. 5B is a picture of a surface of a comparative example of an alignment layer taken after rubbing the alignment layer which is formed by blending a polyimide and a polyamic acid.

As described above, the imide monomer (□) and the amic acid monomer (Δ) are covalently bonded through the linkage group (○) at the interface of the first region 11a and the second region 11b. The covalent bond is so strong that even a physical force induced by rubbing may not break the covalent bond. Accordingly, detachment of the alignment layer is significantly reduced or effectively prevented. Consequently, damages on the surface of the alignment layer caused by fragments and alignment defects caused by impurities in LC layer, which are generated by particles coming off, or detaching from, the alignment layer are prevented. FIG. 5A is a picture of a surface of an alignment layer taken after rubbing the alignment layer which is formed to have a block copolymer structure between polyimide and polyamic acid according to an exemplary embodiment of the present invention. FIG. 5b is a picture of a surface of an alignment layer taken after rubbing the alignment layer which is formed by simple blending of polyimide and polyamic acid.

As shown in FIG. 5A, the exemplary embodiment of an alignment layer according to the present invention, which has polyimide and polyamic acid forming a covalent bond, does not generate any fragments or damages on the surface of the alignment layer even after rubbing.

On the contrary, as shown in FIG. 5B, the alignment layer has come off partially and generated fragments because polyimide and polyamic acid are blended without a covalent bond.

These fragments may exist on the surface of the alignment layer during and after manufacturing the LCD or they may inflow into the LC layer and cause serious defects in alignment of the liquid crystal molecules.

As described above, when the alignment layer is formed to have a block copolymer structure between polyimide and polyamic acid, detachment of the alignment layer, which cause damages to the surface of the alignment layer and defects in alignment of the liquid crystal molecules is significantly reduced or is efficiently prevented.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A liquid crystal display comprising: a first display panel and a second display panel facing each other; an alignment layer formed on at least one of the first and the second display panels and comprising polyamic acid moieties and polyimide moieties which form a block copolymer, and a liquid crystal layer interposed between the first display panel and the second display panel, wherein the polyimide moieties and the polyamic acid moieties are connected to each other with a covalent bond formed between the polyimide moieties and the polyamic acid moieties, and the polyimide moieties are disposed between the polyamic acid moieties and the liquid crystal layer.

2. The liquid crystal display of claim 1, wherein the polyamic acid moieties and the polyimide moieties have dianhydride structure.

3. The liquid crystal display of claim 1, wherein the block copolymer is described by the following structural formula:

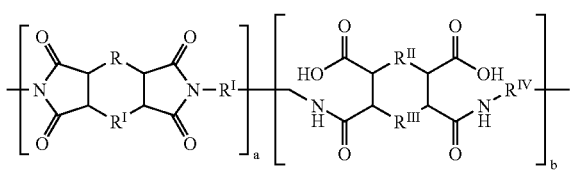

wherein R, $R^I$, $R^{II}$, $R^{III}$ and $R^{IV}$ are linkage groups chosen among aliphatic groups or aromatic groups, and 'a' and 'b' are integers respectively chosen from the numerals of about 10 to about 500.

4. The liquid crystal display of claim 1, wherein the polyamic acid moieties and the polyimide moieties are connected through linkage groups including an aromatic group.

5. The liquid crystal display of claim 1, further comprising:
a plurality of gate lines formed on the first display panel including;
a plurality of data lines intersecting the gate lines;
a plurality of thin film transistors connected to the gate lines and the data lines; and
a plurality of pixel electrodes connected to the thin film transistors.

6. The liquid crystal display of claim 1, wherein the alignment layer aligns liquid crystal molecules of the liquid crystal layer substantially parallel to surfaces of the first display panel and the second display panel.

\* \* \* \* \*